United States Patent Office 2,989,533
Patented June 20, 1961

---

2,989,533
BASICALLY SUBSTITUTED DIPHENYL-CARBINOL ESTERS AND A PROCESS FOR PREPARING THEM
Leonhard Stein, Bad Soden (Taunus), and Ernst Lindner, Frankfurt am Main, Germany, assignors to Farbwerke Hoechst Aktiengesellschaft vormals Meister Lucius & Bruning, Frankfurt am Main, Germany, a company of Germany
No Drawing. Filed July 15, 1958, Ser. No. 748,585
Claims priority, application Germany July 18, 1957
9 Claims. (Cl. 260—294.3)

It is known that α,α-diphenyl-β-amino-propanol derivatives showing a very good cough soothing efficiency and produced by reaction of ketones basically substituted in α-position or of propionic acid esters with phenyl-magnesium halides have already been proposed.

Now we have found that amino-benzoates in compounds of the general formula

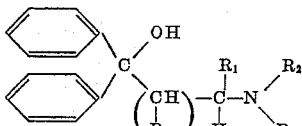

wherein $R_1$ represents hydrogen or the methyl group and $R_2$ and $R_3$ are methyl- or ethyl-groups or together with the nitrogen atom are members of a piperidino or a pyrrolidino radical and $n$ stands for the numbers 0 or 1 or their acid addition salts are characterized by an excellent cough soothing efficiency in the absence of analgesic properties.

The further object of the invention is also the production of compounds of the general formula

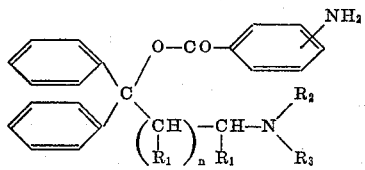

wherein $R_1$, $R_2$, $R_3$ and $n$ have the meanings given above, by esterifying basically substituted diphenyl-carbinols of the above-mentioned formula with aminobenzoic acids or with nitrobenzoic acids or a reactive derivative of these acids and, when using nitrobenzoic acids, by reducing the nitro group to the amino group in the esters obtained.

The basically substituted diphenyl carbinols used as starting materials can be produced, for instance, by reacting basically substituted phenyl-ethyl ketones or propionic acid esters with Grignard compounds. The phenyl-ethyl ketones can be produced for example by treating α-bromo-propiophenones with primary or secondary amines such as methylamine, ethylamine, dimethylamine, diethylamine, pyrrolidine and piperidine. As starting substances there are mentioned for instance 1,1-diphenyl-2-dimethylamino-propanol-(1), 1,1-diphenyl-2-methyl-3-piperidino-propanol-(1), 1,1-diphenyl-2-pyrrolidino-propanol-(1), 1,1-diphenyl-2-piperidino-propanol-(1), 1,1-diphenyl-2-methyl-2-diethylamino-propanol-(1).

The esterification is carried out in known manner, the amino acid or the nitrobenzoic acid being advantageously used in the form of their reactive derivatives such as halides, esters, anhydrides, amides, hydrazides or azides.

When using nitrobenzoic acids or the corresponding reactive derivatives the nitro group in the esters obtained is transformed into an amino group according to the methods known for this purpose. The usual reducing agents can be used for the reaction as well as the catalytic hydrogenation.

The compounds obtained can be converted into the corresponding salts by reaction with organic or inorganic acids. As inorganic acids there come into consideration for example hydrohalic acids such as hydrochloric acid and hydrobromic acid, further sulfuric acid, phosphoric acid and amidosulfonic acid. As organic acids there can be used e.g. formic acid, acetic acid, malonic acid, succinic acid, lactic acid, maleic acid, p-amino-salicylic acid and aceturic acid.

The compounds obtained according to the process of the present invention are valuable medicaments characterized by an extraordinarily good cough soothing action. Their efficiency nearly corresponds to that of the known 1,1-diphenyl-1-(dimethylamino-ethyl)-butanone-(2) but in contradistinction to the known remedy they exhibit no analgesic activity; thus the main factor which determines the existence of a mania provoking effect is lacking in the new compounds.

For instance, the 4-amino-benzoic acid-α,α-diphenyl-β-piperidino-propyl ester-hydrochloride exhibits the same efficiency as the afore-mentioned known compound, as has been ascertained when examining the cough soothing efficiency by administration to the cat is pernoctone narcosis. When examining the toxicity there was found a lethal dose of 90 milligrams/kilogram after having intravenously injected to the mouse a solution of 1% strength adjusted to a pH of 4.

75 milligrams/kilogram were tolerated. A permanent test in which, for a duration of 6 weeks, per day 10 milligrams/kilogram were orally administered to the rat proved increased weight corresponding to normal growth. The dose administered was fully tolerated. The blood pictures did not show any reduction of the hemoglobin index or of the number of erythrocytes, nor did the white blood picture vary in any way from the normal values. When administered to humans 15–20 drops of a solution of 1% strength given several times per day are sufficient. The 4-aminobenzoic acid-α,α-diphenyl-β-dimethylamine-propyl ester-dihydrochloride likewise exhibits an extraordinarily good cough soothing effect as ascertained by intravenous injection of 1 milligram/kilogram of the compound in the cat in pernoctone narcosis. When intravenously applied, the lethal dose of a solution of 0.1% strength amounts to 30 milligrams/kilogram. With intravenous injection of 0.5 milligram/kilogram to the cat in pernoctone narcosis the 4-aminobenzoic acid-α,α-diphenyl-β-methyl-8-diethylamino-propyl ester-dihydrochloride has shown about the same cough soothing efficiency as exhibited by the known 1,1-diphenyl-1-(dimethylaminoethyl)-butanone-(2). When intravenously injecting a solution of 0.5% strength, the lethal dose amounts to 35 milligrams/kilogram.

The compounds can be worked up as such or in many cases more favorably in the form of their acid addition salts to pharmaceutic preparations if desired by admixture of pharmaceutically usual carriers. Thus, they can be applied for instance in the form of tablets, dragées, capsules, drops, liquors or suppositories.

The following examples serve to illustrate the invention but they are not intended to limit it thereto.

EXAMPLE 1

*4-aminobenzoic acid-1,1-diphenyl-2-piperidine-propyl-ester*

To a solution of 200 grams of 1,1-diphenyl-2-piperidino-propanol-(1)-benzoyl-chloride in 500 cc. of ether a solution of 63 grams of nitro-benzoic acid chloride in 200 cc. of ether is added. After standing for 1 day the product which has crystallized out is filtered off with suction and immediately taken up in water and acetic ester. The ethyl-acetate solution is separated off, washed for a short time with water and dried by means of sodium sulfate. The excess of acetic ester is distilled off under reduced pressure. The remaining crystalline residue is recrystallized from cyclohexane. 120 grams of 4-nitrobenzoic acid-1,1-diphenyl-2-piperidino-propyl ester are obtained, melting at 130–132° C.

120 grams of the ester obtained are dissolved in 700 cc. of methanol, 2 mols of methylalcoholic hydrochloric acid are added and the whole is hydrogenated by means of hydrogen in the presence of palladium. When the calculated amount of hydrogen has been taken up the catalyst is filtered off with suction and the acid solution is evaporated under reduced pressure. The crsytalline residue is recrystallized from alcohol and ether. 75 grams of 4-aminobenzoic acid-1,1-diphenyl-2-piperidino-propyl ester-dihydrochloride are obtained, melting at 186–188° C.

The reduction with Raney nickel as catalyst can be carried out in the same manner.

EXAMPLE 2

*4-aminobenzoic acid-1,1-diphenyl-2-dimethylamino-propyl ester*

To a solution of 64 grams of 1,1-diphenyl-2-dimethylamino-propanol-(1) in 100 cc. of ether there is added a solution of 23.2 grams of 4-nitrobenzoic acid-chloride in 100 cc. of ether. After standing for 1 day the crystalline mass is filtered off with suction and taken up in water and acetic ester. The separated ethyl-acetate solution is dried and evaporated and the residue is recrystallized from benzene, while petroleum ether is added. 40 grams of 4-nitrobenzoic acid-1,1-diphenyl-2-dimethylamino-propyl ester are obtained, melting at 134–136° C.

18.5 grams of the ester obtained are dissolved in 300 cc. of methanol, 2 mols of methylalcoholic hydrochloric acid are added and the whole is hydrogenated by means of hydrogen in the presence of palladium. When the calculated amount of hydrogen has been taken up, the catalyst is filtered off with suction and the alcoholic solution is concentrated under reduced pressure. The remaining residue is recrystallized from methanol with addition of acetic ester. 14 grams of 4-aminobenzoic acid-1,1-diphenyl-2-dimethylamino-propyl ester-dihydrochloride are obtained, melting at 171–173° C.

EXAMPLE 3

*4-aminobenzoic acid-1,1-diphenyl-2-piperidino-propyl ester*

To a solution of 42 grams of 1,1-diphenyl-2-piperidino-propanol-(1) in 120 cc. of absolute ether there is added a solution of 12 grams of 4-aminobenzoic acid chloride in 80 cc. of ether. After standing for 1 day the reaction mixture is diluted with water and acetic ester. The ether-ethyl-acetate-solution is separated off, washed with water, dried by means of sodium sulfate and the ether excess and the acetic ester are removed under reduced pressure. The remaining residue is dissolved in alcohol and 2 mols of alcoholic hydrochloric acid are added. There is obtained the 4-aminobenzoic acid-1,1-diphenyl-2-piperidino-propyl ester-dihydrochloride, melting at 186–188° C.

EXAMPLE 4

*4-aminobenzoic acid-1,1-diphenyl-2-methyl-3-diethylamino-propyl ester*

26 grams of 1,1-diphenyl-2-methyl-3-diethylamino-propanol-(1) are dissolved in 100 cc. of ether and 9 grams of 4-nitrobenzoyl-chloride in 300 cc. of ether are added. After standing for 1 day water is added, the ether solution is separated off and the excessive ether is distilled off. The residue is neutralized with alcoholic hydrochloric acid, whereby the 4-nitrobenzoic acid-1,1-diphenyl-2-methyl-3-diethylamino-propyl ester-hydrochloride melting at 162–164° C. is obtained in a yield of 13 grams. 13 grams of the hydrochloride obtained are dissolved in 300 cc. of methanol and hydrogenated by means of palladium and hydrogen at room temperature. When the calculated amount of hydrogen has been taken up, the catalyst is sucked off and the solution is evaporated. To the remaining residue there is added a second mol of hydrochloric acid whereby the 4-aminobenzoic acid-1,1-diphenyl-2-methyl-3-diethylamino-propyl ester-dihydrochloride crystallizes out. It melts at 164–165° C.

EXAMPLE 5

*4-aminobenzoic acid-1,1-diphenyl-2-pyrrolidino-propyl ester*

35 grams of 1,1-diphenyl-2-pyrrolidino-propanol-(1) are dissolved in 100 cc. of ether and a solution of 11.5 grams of 4-nitro-benzoyl-chloride in 40 cc. of ether is added thereto. After standing for 1 day water and benzene are added and the whole is thoroughly stirred. The benzenic solution is sepaarted off, dried and the solvent is distilled off under reduced pressure. The remaining residue is recrystallized from acetic ester. In this way 15 grams of 4-nitro-benzoic acid-1,1-diphenyl-2-pyrrolidino-propyl ester are obtained, melting at 147–149° C.

15 grams of the ester obtained are suspended in 150 cc. of methanol, 2 mols of alcoholic hydrochloric acid are added and the suspension is hydrogenated by means of hydrogen in the presence of palladium. After having taken up the calculated amount of hydrogen, the catalyst is filtered off with suction and the solution obtained is concentrated in vacuo. Acetone is added to the remaining residue and after stirring severel times it is filtered off with suction. After recrystallization from methanol and acetic ester the 4-amino-benzoic acid-1,1-diphenyl-2-pyrrolidino-propyl ester-dihydrochloride melts at 190–191° C. The yield amounts to 11.5 grams.

We claim:

1. The compounds selected from the group consisting of basically substituted alpha,alpha-diphenyl carbinol esters of the formula

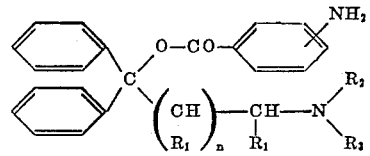

wherein $R_1$ is a member selected from the group consisting of hydrogen and methyl, $R_2$ and $R_3$ are members selected from the group consisting of methyl and ethyl, and together with the nitrogen atom are further members of the piperidino and the pyrrolidino ring and $n$ is an integer selected from 0 and 1, and non-toxic acid addition salts thereof.

2. The compound of the formula

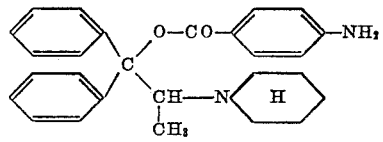

3. The hydrochloride of the compound of the formula

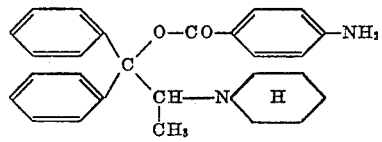

4. The compound of the formula

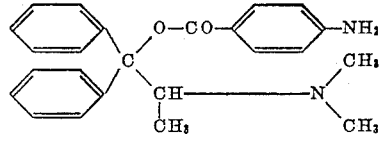

5. The dihydrochloride of the formula

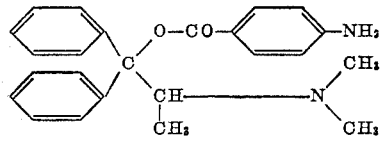

6. The compound of the formula
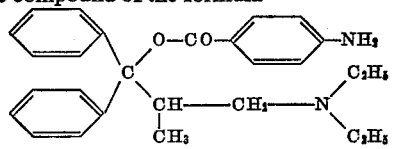
7. The dihydrochloride of the compound of the formula
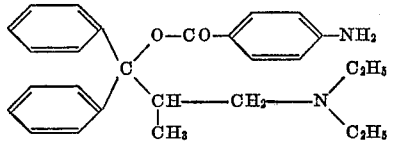
8. The compound of the formula
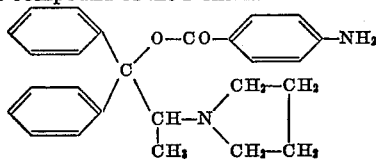
9. The dihydrochloride of the compound of the formula
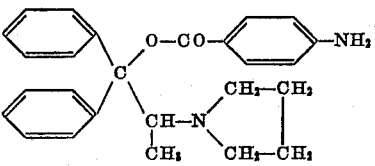
References Cited in the file of this patent
UNITED STATES PATENTS
2,827,460    Stein et al. _____ Mar. 18, 1958
FOREIGN PATENTS
12,843    Great Britain _____ Feb. 22, 1906
683,950    Great Britain _____ Dec. 10, 1952
OTHER REFERENCES
McElvain, J.A.C.S., vol. 49, pages 2835–2838 (1927).
Marvel et al.: J.A.C.S., vol. 51, pp. 915–917 (1929).